Patented Apr. 14, 1942

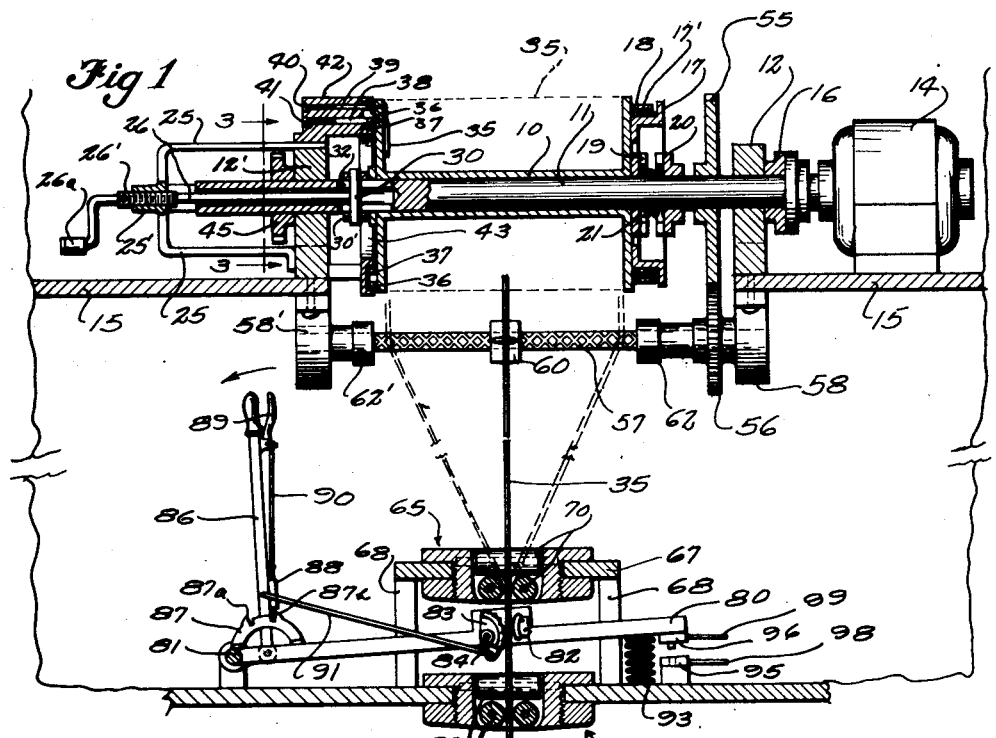

2,279,605

UNITED STATES PATENT OFFICE 2,279,605

ALTITUDE FEELER FOR AIRCRAFT

Charles H. Welsh, Roseburg, Oreg.

Application November 25, 1938, Serial No. 242,309

3 Claims. (Cl. 200—52)

This invention relates to what is termed an "altitude feeler" and is designed for use in particular by aircraft; it being an object of this invention to provide a means to be used during night flights, or when ever visibility is such as to obscure the ground, for indicating by signals to the pilot the fact that the craft is dangerously low.

More specifically stated, it is an object of this invention to provide an "altitude feeler" in the form of a suspended weight which is adapted to be lowered from an aircraft and operate when lowered to actuate signals mounted on the instrument board of the plane, to operate and warn the pilot that he is within that distance of the ground to which the cable suspending the feeler is reeled out.

Further objects of this invention reside in the provision of a novel means for reeling out and hauling in the cable which suspends the feeler weight or ground contact member.

Other objects of the invention reside in the provision of means for operating a signal to notify the pilot should the feeler be disconnected from the cable or broken, by impact with any object.

Still further objects of the invention reside in the details of construction in the combination of parts and mode of operation of the device, as will be hereinafter fully described.

In accomplishing these and other objects of the invention, I have provided the improved details of construction the preferred forms of which are illustrated in the accompanying drawing, wherein—

Fig. 1 shows in sectional detail, the means for reeling out and hauling in of the cable that suspends the feeler weight.

Fig. 2 is a cross sectional detail of the feeler weight.

Fig. 3 is a sectional detail as seen on the line 3—3 in Fig. 1, particularly illustrating the means for metering the amount of cable reeled out.

Fig. 4 is a view diagrammatically showing the circuit wiring of the present apparatus.

Briefly described, the invention comprises a weight in the form of a ball or bob that is suspended by a cable; the cable being adapted to be reeled out from the plane, or aircraft, when in flight and adapted to be hauled in preparatory to the landing of the craft. The invention also includes, in connection with the means for reeling out and hauling in of the cable, a motor driven cable reel equipped with a mechanical brake to be used for stopping and holding the reel against rotation, and means for operatively connecting the reel to its supporting and driving shaft, which in turn, is operatively connected to or a continuation of the motor shaft, means for laying the cable in orderly, successive layers on the reel, and also means for connecting the cable to a switch system that operates a signal to notify the pilot should the feeler be disconnected from the cable or the cable broken.

Referring more in detail to the drawing—

In Fig. 1, I have illustrated a reel 10 revoluble on a supporting shaft 11, which in turn, is revolubly mounted within two spaced bearing blocks 12—12' fixed to a suitable floor or base as designated at 15. An electric motor 14 is mounted upon the base 15, and is operatively connected to the shaft 11 by a coupling 16. A brake flange or drum 17 is mounted concentrically on one end of the reel 10, and fitted thereto is a brake band 18 adapted to be tightened against the brake lining 17' which is applied to the brake drum to retard or hold the reel against turning.

A clutch connection is provided between the reel 10 and the shaft 11 comprising the separate toothed clutch collars 19 and 20 applied about shaft 11; the clutch collar 19 being fixed to the reel 10 and the clutch collar 20 being fixed to the shaft 11, with a coiled compression spring 21 disposed between the collars to normally hold them in spaced relation.

Fixed to the bearing block 12' is a horizontally extending V-shaped bracket 25, which mounts a threaded shaft 26 in its base portion, which shaft is equipped with a turning crank arm 26A whereby it may be rotated and thus, by reason of a threaded connection 26' with bearing 25' may be moved inwardly or outwardly in the mounting. It will be noted that this shaft 26 is of considerably smaller diameter than the shaft 11, and is disposed within a coaxial bore within the shaft 11. This shaft 26 is so disposed as to contact at its inner end a cross pin 30 contained within a transverse slot 32 in the shaft 11 adjacent the end of the reel 10, and mounted by a collar 30' that is disposed to bear against the adjacent end of the reel 10 for the purpose of shifting the latter on shaft 11 to cause the clutch collars 19 and 20 to engage properly.

The cable 35, which is of two circuit wire construction, has its two wires electrically connected respectively with two concentric conductive rings 36 and 37 fixed on the outer end wall of the reel. The cable is wound upon the reel 10, as illustrated in Fig. 1. These rings 36 and 37 are properly insulated and operate as conductors of an electrical current and have yieldable brushes 38 and 39, mounted by the bracket 42, and held in contact therewith by small compression springs 40 and 41 contained in the bracket 42. This bracket 42, as is a protective shield 43, disposed to cover and protect the rings 36 and 37, are of electrically non-conducting material, such as Bakelite or the like.

Fixed upon the shaft 11, inside of the bracket 25 is a gear 45, which acts also as a collar and cooperates with the coupling 16, to hold the shaft against lateral movement. In operative mesh with the gear 45 is a gear train which includes the gears 46, 47, and 48, carried by shafts, 49 and 50 as seen in Fig. 3, to move an indicator hand 51, and indicate upon a calibrated dial 52, the footage of cable that is paid out from the reel.

It will be seen that a gear 55 is mounted on the shaft 11 at the end of the reel 10 nearest the motor 14, and this gear is in operative mesh with a smaller gear 56 which is fixed upon a cross shaft 57 mounted in bearing blocks 58 and 58' disposed beneath the baseboard 15. It will be noted also that the shaft 57 is provided with spiral grooves and that a ratchet block 60 is disposed to travel on the shaft along the grooves alternately in opposite directions to lay the cable 35 even and regularly upon the reel 10. Regardless of which direction the reel may revolve, the ratchet block 60 travels from end to end on the shaft 57 and is reversed in its direction of travel by contacting the fixed shoulders of encircling flanges 62 and 62'. This mechanism is of a type similar to that used on fishing reels, and is of well known construction and operation, so therefore a detailed description is deemed unnecessary.

As the cable 35 is reeled from or onto the reel 10, it passes through two sets of guides, for reasons subsequently to be explained; these guides being designated by the reference numerals 65 and 66, are disposed one above the other, the lower one being mounted, when used in an airplane, in the lower or bottom wall of the plane fuselage.

These guides are of similar construction, the upper one being mounted upon a disc 67 which is supported by four legs or supports 68 for the bottom of the fuselage.

These guides comprise suitable cylindrical rolling surfaces 70, rotatably mounted and supported by the frame 71, and it will be noted that in each guide 56 and 66, there are four cylindrical rollers 70, two of which are disposed at right angles to and somewhat above the other two in the guide, thereby providing a universal rolling surface to the cable 35, regardless of what angle it may enter or leave the guides.

A lever 80, pivotally mounted as at 81, is disposed between the guides 65 and 66, and is provided with both a stationary and a movable gripper, designated respectively by reference numerals 82 and 83. The movable gripper is pivotally mounted as at 84, eccentric of the center of its curvature, so as to have a gripping action on the straight run of the cable 35 that is between the two roller guides.

Mounted upon the pivoted end of the lever 80, is a vertical hand lever 86 and an arcuately formed guide 87 with stops 87a and 87b thereon adapted to lock the lever 86 in a "release" position or "gripping" position by a latch or lock 88 which is operated by the hand release 89 through a connecting rod 90.

A rod 91 connects the lever 86 to the pivotally mounted gripper 83 so that a movement of the lever 86 in the direction of the arrow effects a rotation of the gripper so as to grip the cable 35.

At its free end, the lever 80 is yieldably supported by a compression spring 93, and an electrical contact 95 is fixed thereon to engage a stationary electrical contact 96, as a means to close a circuit in the wires 98 and 99.

By reference to Fig. 2, the feeler indicated by the reference numeral 110, comprises an outer and inner spherical metal shell, indicated by the reference numerals 111 and 112 respectively, between which is a packing 113 of resilient material, such as steel wool or the like. These shells are constructed in halves and joined together, as illustrated in a formed, threaded portion 111a and 112a.

It will be noticed that within the inner sphere there is a metal ring 115 supported by four bracing supports 116, to which the wires 117 are connected. The wires 117 all branch from a common wire 35a that is one of the wires of the supporting cable. The other wire 34b enters through the top of the sphere and is connected to a coiled spring 118, which has its lower end disposed within the metal ring 115. Two supporting wires 119 are connected to the eyelets on the sphere and to the cable 35, and serve only to strengthen the supporting of the feeler 110.

Referring now to Fig. 4, the wiring diagram will now be explained:

From a source of electrical power, such as a battery indicated at 120, a wire 121 connected to the positive side of the battery leads to the contact 38, which has yieldable bearing with the contact ring 37. Connected to the contact ring 37 is the wire 35a of the cable 35, and connected to the contact ring 36 is the cable wire 35b of the cable 35. Connected to the contact 36 which has yieldable bearing against the contact ring 36 is a wire 122 which leads to a signal lamp 124, located on the instrument board of the plane, and which lamp has a return line 125 connected to the negative pole of the battery 120. The line 99 is joined to the line 121, and to the contact 95, and the line 98 is connected to the contact 96 and leads to the signal lamp 130, having a return line 131 that is joined to the negative return line 125. A switch 135 in the line 121 may be opened rendering the entire apparatus electrically inoperative.

Assuming the device to be so constructed, its use and operation would be as follows:

When a pilot, flying an airplane at night or in weather which renders the visibility bad, wishes to use the altitude feeler, he manually turns the crank 26a so that the shaft 26 is carried inwardly by the threads 26' thereon. The shaft 26 engages the pin 30 and causes the reel 10 to be moved axially on the shaft 11, so that the clutch teeth 19 on the reel engage the clutch teeth 20 that are fixed on the shaft. Then by starting the motor, the reel is rotated, causing the cable to be paid out. After a certain amount of the cable has been paid out, the reel may be disengaged from the clutch connections, and the cable allowed to pay out by gravity. By control of the brake band 18, the feeler may be lowered from the plane to any desired extent and this will be indicated by the pointer 51 on the calibrated dial 52.

When the feeler has been lowered to the desired distance, the lever 86 is manually moved in the direction of the arrow adjacent thereto, and this causes the gripper 83 to be moved to effect a gripping action on the cable 35.

Should the plane descend to an altitude less than the amount of cable paid out, the feeler 110 will strike the ground, and the spring 118 will contact the ring 115, thereby closing an electrical circuit in the lines 35a and 35b of the cable 35, and causing the signed lamp 124 to light, thereby warning the pilot of the plane of his dangerous altitude.

Should the feeler become entangled in a tree or any other obstruction on the ground, and become disconnected from the cable or break the cable, the lever 80 will be jerked downwardly against the compression spring, causing the contacts 95 and 96 to engage, thereby completing the circuit to the warning lamp 130 through the wires 98 and 99, whereupon the cable may be reeled in and a new feeler attached to the cable.

When it is desired to reel in the cable to elevate the feeler to the plane, the reel is shifted on its supporting shaft by operation of the crank 26, the gripper released, and by releasing the brake on the reel and operating the motor, in the opposite or reverse direction to which it was operated to pay out the cable to lower the feeler.

It is thought that the foregoing description along with the drawings, are readily understandable, and the advantages of use of such an altitude feeler will be readily apparent, especially when a plane is being flown over strange or mountainous country, either at night or in weather which renders the visibility very bad.

Having thus described my invention, what I claim as new and novel therein, wish to secure by Letters Patent:

1. In a device of the character described, a circuit closing switch comprising a pivotally mounted lever, a circuit contact member on the lever, a stationary contact member, yieldable means acting against the lever to normally retain the said contacts disengaged from each other, a clutch device on the lever, a suspended cable passing therethrough, means for actuating the clutch for gripping the cable and means on the suspended cable to contact an object for the actuation of the lever through the mediacy of the cable to effect the engagement of the contacts for closing an electric circuit therethrough.

2. In a device of the character described, a circuit closing switch comprising a pivotally mounted lever, a circuit contact mounted on the lever at its movable end, a circuit contact mounted in position to be engaged by the first mentioned contact for closing an electric circuit through them, a spring acting against the lever to normally retain it in such position that the said contacts will be disengaged, a pair of grip jaws on the lever spaced for the passing of a cable between them, a suspended cable passing between the jaws and means on the lever for actuating one of the jaws toward the other for the gripping of the cable and a weight suspended by the cable to contact an object to effect the actuation of the switch lever to engage the contacts.

3. In a device of the character described, a circuit closing switch comprising a pivotally mounted lever, a circuit contact mounted on the lever at its movable end, a circuit contact mounted in position to be engaged by the first mentioned contact for closing an electric circuit through them, a spring acting against the lever to normally retain it in such position that the said contacts will be disengaged, a pair of grip jaws on the lever spaced for the passing of a cable between them, a suspended cable passing between the jaws, a hand lever pivotally mounted on the switch lever, means connecting the hand lever with one of the jaws for closing it against the cable to provide a holding grip thereon whereby to render the switch lever operable through the mediacy of the cable to close the circuit and a weight suspended by the cable to contact a relatively moving object to actuate the lever.

CHARLES H. WELSH.